:::

(12) United States Patent
Meadows et al.

(10) Patent No.: US 8,991,031 B2
(45) Date of Patent: Mar. 31, 2015

(54) RESTRAINT SYSTEM AND METHOD FOR HIGH PRESSURE PIPELINE

(71) Applicant: Gangline, LLC, Fort Worth, TX (US)

(72) Inventors: Marc A. Meadows, Forth Worth, TX (US); Bruce Hartin, Dallas, TX (US)

(73) Assignee: Gangline LLC, Fort Worth, TX (US)

(*) Notice: Subject to any disclaimer, the term of this patent is extended or adjusted under 35 U.S.C. 154(b) by 305 days.

(21) Appl. No.: 13/686,531

(22) Filed: Nov. 27, 2012

(65) Prior Publication Data

US 2014/0145428 A1   May 29, 2014

(51) Int. Cl.
B23P 11/00 (2006.01)
F16L 35/00 (2006.01)

(52) U.S. Cl.
CPC ..................... F16L 35/00 (2013.01)
USPC ....................... 29/525.01; 285/117

(58) Field of Classification Search
USPC ............... 29/525.01, 430, 281.4, 281.5, 282; 285/117, 114, 81; 137/377; 138/119; 24/115 K, 115 R, 129 R, 335, 115 H, 24/114, 298, 300
See application file for complete search history.

(56) References Cited

U.S. PATENT DOCUMENTS

| 1,941,358 | A |   | 12/1933 | Longfellow |
| 3,197,240 | A | * | 7/1965 | Lindberg ................... 285/114 |
| 3,859,692 | A |   | 1/1975 | Waterman et al. |
| 4,549,332 | A |   | 10/1985 | Pouliot |
| 6,298,882 | B1 | * | 10/2001 | Hayes et al. .................. 138/99 |
| 6,481,457 | B2 |   | 11/2002 | Hayes et al. |
| 8,132,595 | B2 |   | 3/2012 | Gayaut |

* cited by examiner

Primary Examiner — John C Hong
(74) Attorney, Agent, or Firm — Geoffrey A. Mantooth

(57) ABSTRACT

Restraints are used to restrain a pipeline having pipe segments coupled together in an end-to-end manner. A first restraint is coupled to first and second pipe segments, which are non-adjacent to one another. A second restraint is coupled to third and fourth non-adjacent pipe segments, wherein the third pipe segment is between the first and second pipe segments. The first and second restraints are coupled together at an overlapping portion.

5 Claims, 3 Drawing Sheets

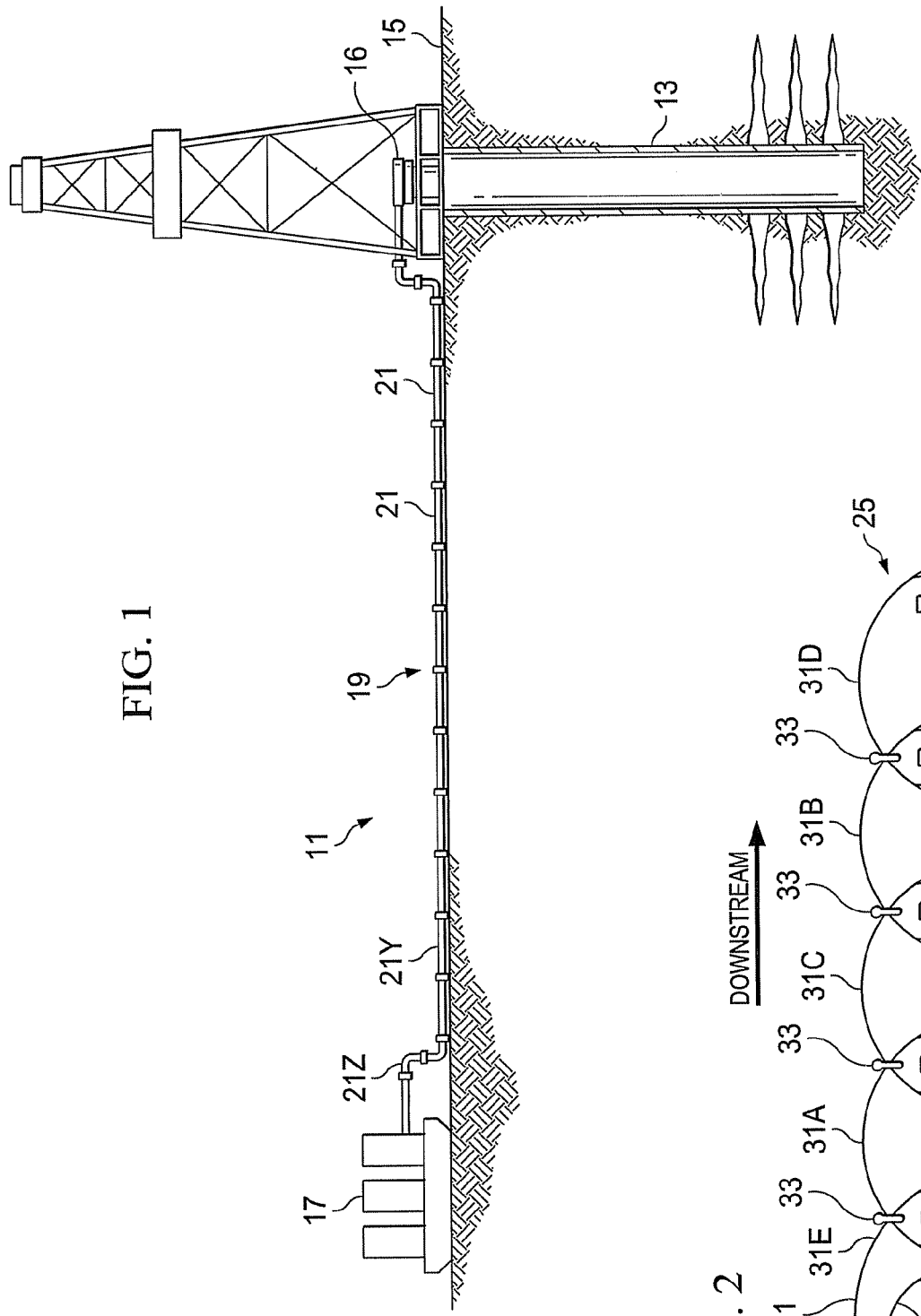

RESTRAINT SYSTEM AND METHOD FOR HIGH PRESSURE PIPELINE

FIELD OF THE INVENTION

The present invention relates to restraining systems and methods for pipelines and in particular for high pressure pipelines.

BACKGROUND OF THE INVENTION

Many applications require pipelines that are capable of withstanding high pressures. An example of such an application is found in oil and gas well drilling. After a well is drilled, completion of the well may involve a procedure known as fracturing or "fracking". In fracking, a fluid is pumped down the well at high pressure in order to increase the porosity of flowability of the oil and gas producing formation.

Fracturing pressures can be very high, as much as 15,000 psi. To get a sense of how high this is, compare 15,000 psi pressure with the more typical 60 to 70 psi found in a typical kitchen water faucet.

By its very nature, oil and gas well drilling is a temporary endeavor. During drilling and completion, a drilling rig is positioned on the well site. After completion and the well begins to produce, the drilling rig and other equipment are removed from the well site. This includes the fracking equipment.

The fracturing equipment includes one or more pumps and a pipe arrangement that extends from the pumps to the well. The pumps are mounted on a skid or trailer. The pipe arrangement has lengths of pipe connected together with fittings or couplings. Just like the other drilling rig equipment at the well site, the pipe arrangement is temporary; it is assembled onsite and used to convey high pressure fracking fluid from the pumps to the well, and then it is disassembled after use and moved to another well site.

During operation, if the pipe arrangement should fail by leaking or coming apart, then a dangerous situation rapidly develops, made so by the thousands of pounds of pressure in the pipe. The pipe moves in a reaction to the release of the high pressure fluid. In fact, the pipe moves too rapidly for personnel to react. Nearby personnel can be severely injured, and equipment damaged, by the moving pipe.

A safety restraint system can be applied to the pipe arrangement and is designed to minimize the movement of a pipe in case of a pipe failure. Prior art safety restraint systems are cumbersome, difficult to install and expensive.

SUMMARY OF THE INVENTION

A pipeline restraint system comprises pipe segments having ends and which are coupled together in an end-to-end manner to form the pipeline. Each of the pipe segments have an upstream end and a downstream end. The pipeline has an upstream end and a downstream end. A first restraint is coupled to a first pipe segment and coupled to a second pipe segment. The second pipe segment is upstream from the first pipe segment and non-adjacent to the first pipe segment. A second restraint—is coupled to a third pipe segment and coupled to a fourth pipe segment. The third pipe segment is between the first and second pipe segments. The fourth pipe segment is located downstream of the first pipe segment. The first and second restraints are coupled to each other.

In accordance with one aspect, the first and second restraints are coupled to each other at a location adjacent to the coupling of the first and second pipe segments.

In accordance with another aspect, the first and second restraints are coupled to each other by a ring.

In accordance with another aspect, the first restraint is coupled to the upstream end of the first pipe segment and to the downstream end of the second pipe segment.

In accordance with another aspect, the second restraint is coupled to the downstream end of the third pipe segment and to the upstream end of the fourth pipe segment.

In accordance with still another aspect, the first restraint is coupled to the first and second pipe segments by looping portions of the restraint around the respective first and second pipe segments and securing the respective loop so that the respective loop is self-tightening.

In accordance with another aspect, the respective loop is secured by a ring.

In accordance with another aspect, a third restraint is coupled to the third pipe segment and to an anchor. The third restraint is coupled to the first restraint.

A method of restraining a pipeline, which pipeline has pipe segments, comprises coupling a first restraint to a first set of non-adjacent pipe segments and a second restraint to a second set of non-adjacent pipe segments. A portion of the first and second restraints overlaps. The overlapping portions are coupled together.

In accordance with one aspect, the step of coupling the first and second restraints to the first and second sets of non-adjacent pipe segments further comprises coupling the first and second restraints near respective ends of the pipe segments with self-tightening loops around the respective pipe segment.

In accordance with another aspect, the self-tightening loops are secured from enlarging.

In accordance with still another aspect, the step of coupling the overlapping portion of the first and second restraints together further comprises the step of coupling the overlapping portions with a ring.

In accordance with another aspect, a third restraint is coupled to a first set of non-adjacent pipe segments and to an anchor so as to overlap a portion of the third restraint with the first restraint. The overlapping portions of the first and third restraints are coupled together.

BRIEF DESCRIPTION OF THE DRAWINGS

FIG. 1 is a schematic view of a drilling site for an oil and gas well with a pipe arrangement, having the safety restraint system.

FIG. 2 is a schematic view of the pipe arrangement with the safety restraint system.

DESCRIPTION OF THE PREFERRED EMBODIMENT

Figures 3, 4, 5:
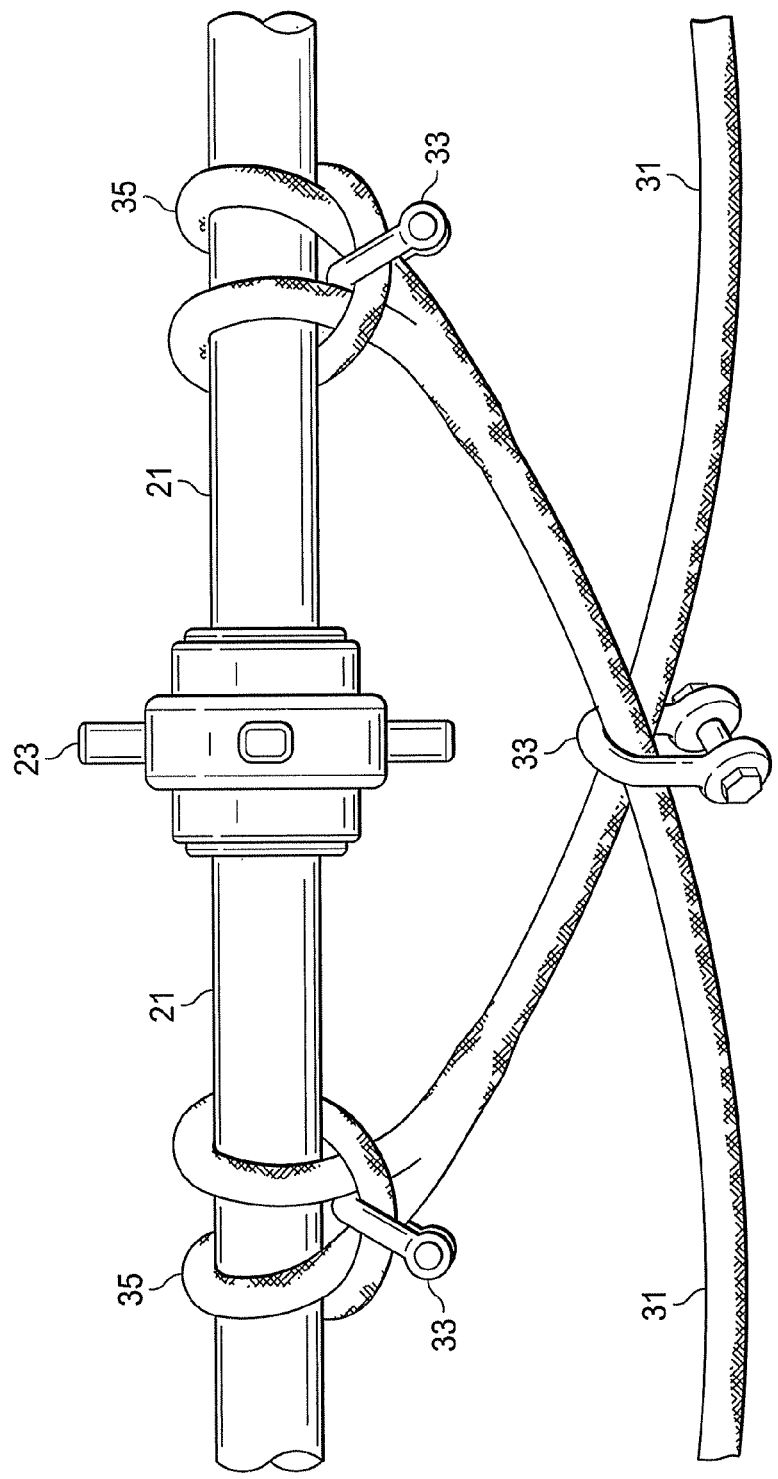
FIG. 3 shows a restraint.
FIG. 4 shows another embodiment of a restraint.
FIG. 5 shows a pipe joint with the safety restraint system.

The safety restraint system and method restrains pipe, and in particular, is well suited for high pressure pipe, in the event of a pipe rupture or leak. When a high pressure pipe ruptures, the escape of high pressure fluid produces a reaction force on the pipe. Without restraint, the pipe moves in a direction opposite to the reaction force. The use of safety restraints greatly minimizes the amount of pipe movement and consequently reduces the risk of injury to personnel and damage to equipment.

The safety restraint system and method are easy to use both in equipping and restraining a pipe arrangement and also in removing the same during disassembly for transport to another site.

In FIG. 1, there is shown a typical example of a pipe arrangement, or pipeline, that benefits from a safety restraint system. FIG. 1 shows a well site 11 having an oil and gas well 13 penetrating into the earth 15 from a wellhead 16. Located some distance away from the well is fracturing equipment 17, which fracking equipment includes pumps. A supply of fracturing fluid (not shown) is provided to the pumps. The pumps are connected to the wellhead 16 by way of a pipe arrangement 19. Although the restraint system is described in the context of an oil and gas well, the restraint system can be used on pipe arrangements in other applications. For example, other oil and gas applications include flow-back operations, slick water, nitrogen and other energized fluid pumping operations. The restraint system can be used on applications other than oil and gas.

In general, the pipe arrangement 19 has a number of pipe lengths, or segments, 21 coupled together in end-to-end fashion. The pipe lengths may be straight, elbows, curved, etc. Most of the pipe arrangement is located on the ground 15 or elevated on blocks.

Referring to FIG. 2, the pipe arrangement 19 extends from the fracturing equipment 17 to the wellhead 16. The pipe arrangement has straight pipe lengths 21Y and elbow pipe lengths 21Z. The elbow pipe lengths 21Z can be 90 degrees or some other angle. The elbow pipe lengths can be fixed or of the swivel type. The straight pipe lengths 21Y can be of various lengths (for example 4-10 feet). The pipe can be, for example, two inch inside diameter and of the 1502 type. The pipe arrangement is designed for high pressure (e.g. 4000-15,000 psi). The pipe lengths 21 are coupled together with fittings 23. The fittings can be of the hammer union coupling type.

The restraint system extends from and between anchors, or fixed points along the length of the pipe arrangement. Thus, the restraint system extends along, and is coupled to, all of the pipe segments in the pipe arrangement. In the embodiment shown in FIG. 1, the anchors are the fracturing equipment 17 and the wellhead 16. The anchors are heavy pieces of equipment that require more force to move than can be produced by a failed pipe arrangement. Alternatively, an anchor can be a stake or a post located in the ground or anything sufficiently heavy or fixed so as to remain immobile during a failure of the pipe arrangement.

The restraint system 25 (see FIG. 2) includes restraints 31 and couplers 33 or constraints.

The restraints 31 are lengths of line, such as rope. The rope can be 12 strand braided rope, which is commercially available. Referring to FIG. 3, one form of the restraint 31 is a length of line with an eye 35 located on each end. The eyes are formed using splices 37. Another form of restraint 31' (see FIG. 4) is an endless loop, where the two ends of the line are spliced 37 or otherwise coupled together.

Alternative materials can be used to form the restraints 31. For example, wire cable can be used. Alternatively, webbing, strapping chain, slings, etc. can be used.

The couplers 33 are rings such as shackles. The shackle of course is a generally "C" shaped piece with a bolt extending through the ends of the "C" to close off the gap. A nut retains the bolt in place. The shackles are made of metal and are commercially available. Other connectors can be used, such as circular rings, D-rings, carabiners, etc.

Installation of the restraint system 25 is remarkably easy. The restraint system can be installed as the pipe arrangement is assembled. Alternatively, the restraint system can be installed after the pipe arrangement has been assembled. The respective pipe lengths 21 are connected by way of the restraints 31, not to adjacent pipe lengths but to non-adjacent pipe lengths. Thus, in the event of a rupture of the pipe arrangement, the pipe is securely retained.

In the description herein, "upstream" and "downstream" are used, with "upstream" being nearer to the fracturing equipment 17 and "downstream" nearer to the wellhead 16. The flow of fluid in the pipe arrangement is from the fracking equipment to the wellhead. The pipe lengths 21 each have an upstream end and a downstream end. (An oil or gas well typically has a return pipeline from the well. If the pressures in the return pipeline require it, the restraint system can be used on the return pipeline.)

Referring to FIG. 2, it is useful to refer to the pipe segments as 21A-21F. One of the pipe lengths 21C has its upstream end coupled by way of a first restraint 31A to a non-adjacent upstream length 21A. In particular, the first restraint 31A is coupled to the downstream end of the upstream pipe length 21A. The downstream end of the pipe length 21C is coupled by a second restraint 31B to the upstream end of a non-adjacent pipe length 21E, which pipe length 21E is located downstream of the pipe length 21C.

The non-adjacent pipe lengths 21A, 21E are at least two pipe lengths from the pipe length 21C that is to be anchored by the first and second restraints 31A, 31B. Thus, the first restraint 31A is coupled, not to the adjacent upstream pipe length 21B, but to the next adjacent upstream pipe length 21A. Likewise, the second restraint 31B is coupled, not to the adjacent downstream pipe length 21D, but to the next adjacent downstream pipe length 21E.

The restraints 31 are coupled to the pipe lengths 21 by way of choke hitches 35 (see FIG. 5). The choke hitches are positioned by the respective pipe length end. The choke hitches are pulled tight. To keep the choke hitches from coming loose and possibly moving out of position away from a pipe end, couplers 33 are used. In the preferred embodiment, the constraint is a shackle inserted into and around the choke hitch. Other types of constraints can be used such as rope, carabiners, split rings, etc. The restraint has a coupler 33 where the restraint loops around the pipe length, as shown in FIG. 5.

The restraints are attached to the pipe lengths by self-tightening loops (for example, the choke hitches. With a self-tightening loop, if the restraint is pulled away from the pipe end, the loop tightens around the pipe. The use of a coupler 33 prevents the loop from expanding and moving out of position.

Figure 6:
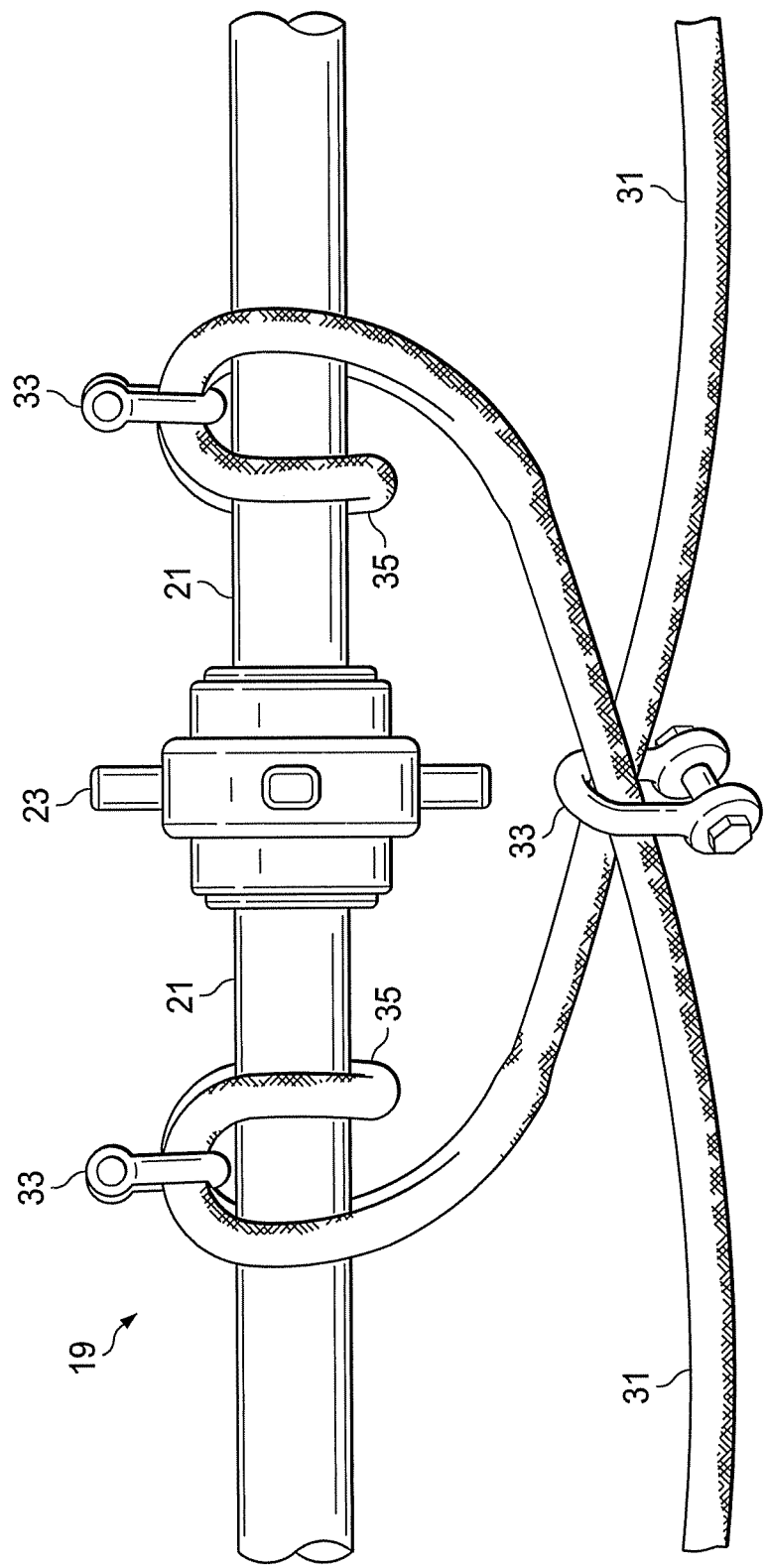
FIG. 6 shows a pipe joint with the safety restraint system in accordance with another embodiment.

Another way to couple a restraint 31 to a pipe length is shown in FIG. 6. An eye 35 of the restraint is wrapped or looped about the pipe, with the eye being closed by a coupler 33. This version is useful for attaching a restraint to an already installed pipe arrangement.

Instead of coupling the restraints together with a shackle, the restraints could be coupled together by passing one restraint through a loop of the other, which loop is around the pipe. The loop retains a self-tightening capability and the restraint does not weaken the loop.

The length of the restraint 31 is somewhat longer than the length of its reach. For example, if the restraint were to cross over an adjacent pipe length that is 10 feet in length, the restraint could be 12 to 14 feet long. Too short of a length makes it difficult to install the restraint. Too long provides too much slack in pipe movement in the event of a pipe arrangement failure. Longer restraints can be made up from the shorter restraints using brief (square) knots or shackles.

Referring now to the next downstream pipe length 21D of FIG. 2, this next downstream length is restrained by third and fourth restraints 31C, 31D. The third restraint 31C is coupled to the upstream end of the pipe length 21D and extends upstream. The third restraint 31C does not couple to the adjacent pipe length 21C, but to the next upstream pipe length 21B. The third restraint 31C is connected to the downstream end of this pipe length 21B. Likewise, the fourth restraint 31D is coupled to the downstream end of the pipe length 21D and extends downstream to a non-adjacent pipe length 21F, where it is coupled to the upstream end.

The respective restraints 31A-31C, 31C-31B, 31B-31D from adjacent pipe segments cross one another. For example, the restraint 31B coupled to the downstream end of pipe length 21C crosses the restraint 31C coupled to the upstream end of the adjacent downstream pipe length 21D.

To further restrain the pipe segments, the restraints 31 are coupled together where they cross one another. In the preferred embodiment, the restraint are coupled together by couplers such as shackles 33, however other couplers, such as rings, carabiners and split rings, can be used. Thus, restraint 31A is coupled or shackled 33 to restraint 31C where the two restraints cross over one another, which cross over is adjacent to the fitting 23C between pipe lengths 21B and 21C. Likewise, restraint 31C is coupled or shackled to restraint 31B at their cross over point and restraint 31B to restraint 31D at their cross over point.

The restraints located at the ends of a pipe arrangement, are coupled to anchor points. For example referring to FIG. 2, if pipe length 21A is at the end of the pipe arrangement, then its end is coupled to an anchor by a restraint 31F. The restraint of the adjacent pipe length 21B, which restraint is 31E, is also coupled to this anchor.

The pipe arrangement may have short segments. This is particularly true at the well head, where short elbow segments are used. Instead of being connected to the next adjacent pipe segment, a restraint may pass over more than one pipe segments to couple directly to the anchor or to another pipe segment.

After the restraints have been installed on the pipe arrangement, they are inspected for proper installation. The preferred embodiment restraint system is easy to visually check, as the restraints cross over one another in a pattern. This makes recognizing and then properly installing a restraint easy.

If the pipe arrangement fails, say at fitting 23C, then the pipe lengths 21C, 21D on either side of the fitting remain close to one another due to the pipe restraint system. The upstream pipe length 21C is constrained from moving too far because its downstream end is secured to pipe length 21E several lengths away. Likewise the upstream end of pipe length 21D is constrained because its upstream end is secured to the upstream pipe length 21B several lengths away. While pipe lengths 21C, 21D do move, the movement is greatly constrained.

The restraint system is easy to disassemble. The couplers 33 are removed and the restraint 31 unlooped from the pipe lengths. The restraint system can be reused.

The foregoing disclosure and showings made in the drawings are merely illustrative of the principles of this invention and are not to be interpreted in a limiting sense.

The invention claimed is:

1. A method of restraining a pipeline, the pipeline having pipe segments, comprising the steps of:
   a) coupling a first restraint to a first set of non-adjacent pipe segments;
   b) coupling a second restraint to a second set of non-adjacent pipe segments, with one of the pipe segments of the second set of pipe segments between the pipe segments of the first set of pipe segments;
   c) overlapping a portion of the first and second restraint;
   d) coupling the overlapping portions together.

2. The method of claim 1 wherein the step of coupling the first and second restraint to the first and second sets of non-adjacent pipe segments further comprises the step of coupling the first and second restraint near respective ends of the pipe segments with self-tightening loops around the respective pipe segment.

3. The method of claim 2 further comprising the step of securing the self-tightening loops from enlarging.

4. The method of claim 1 wherein the step of coupling the overlapping portion of the first and second restraints together further comprises coupling the overlapping portions with a ring.

5. The method of claim 1 further comprising the steps of:
   a) coupling a third restraint to a first set of non-adjacent pipe segments and to an anchor so as to overlap a portion of the third restraint with the first restraint;
   b) coupling the overlapping portions of the first and third restraints together.

* * * * *